Sept. 16, 1958      W. M. FIEDLER      2,851,880
PERMANENT RECORDING ELECTRICAL FORCE-MEASURING CIRCUIT
Filed Feb. 23, 1956
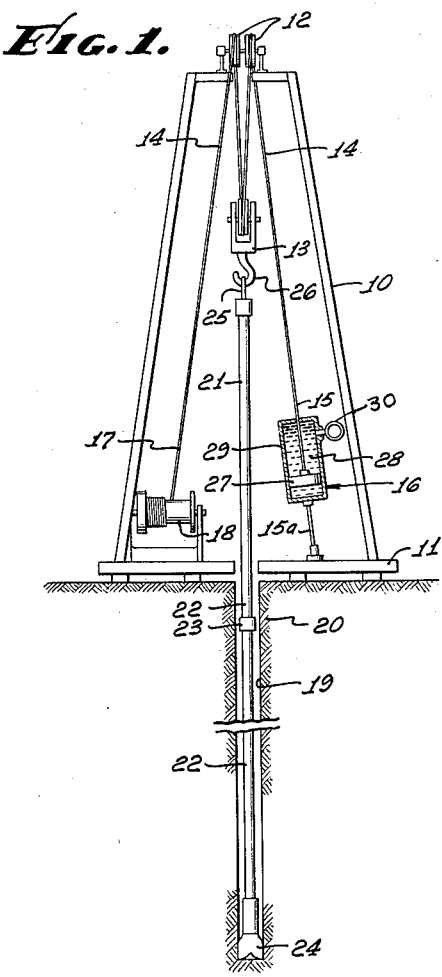
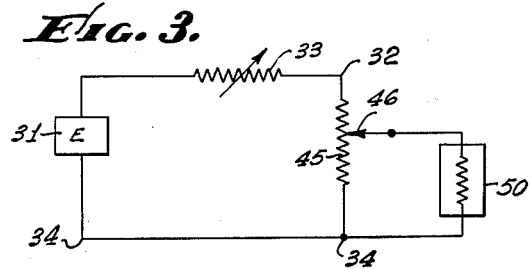
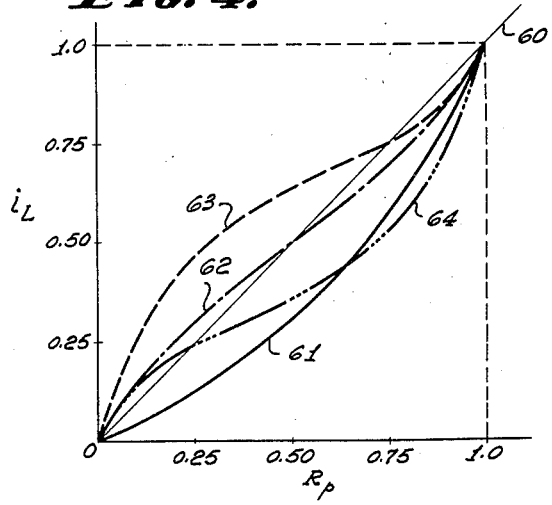
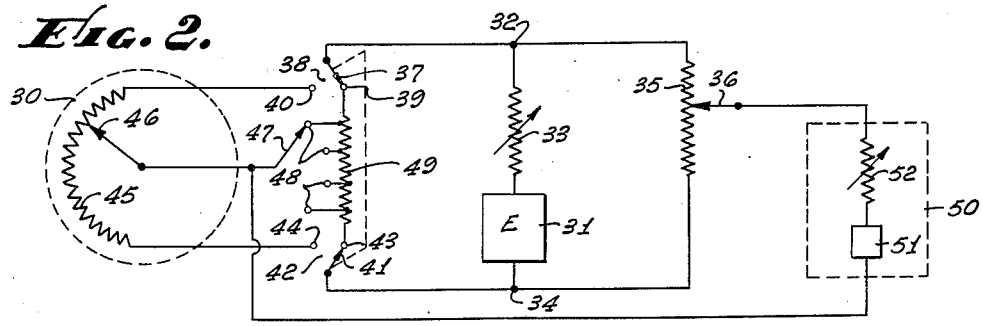
INVENTOR.
WALTER M. FIEDLER
BY
Robert Mednick
ATTORNEY.

United States Patent Office 2,851,880
Patented Sept. 16, 1958

2,851,880

PERMANENT RECORDING ELECTRICAL FORCE-MEASURING CIRCUIT

Walter M. Fiedler, Monterey Park, Calif., assignor to Martin-Decker Corporation, Long Beach, Calif., a corporation of Delaware Application February 23, 1956, Serial No. 567,211

12 Claims. (Cl. 73—141)

The present invention relates to an electrical measuring circuit to be used in connection with drilling of oil wells, and more particularly relates to an electrical measuring circuit which enables permanent recordation of the measured information.

In the operation of drilling for oil, it is desirable to have a permanent recording of measurements made during the operation. The apparatus commonly used for drilling for oil includes a derrick or supporting structure for a hollow drill pipe column terminated by a drill bit which extends into the earth formation being drilled. The drill column is attached to a hook supported by a cable movably secured to the derrick by means of appropriate blocks and pulleys. When the hook is positioned so that the drill bit neither presses nor rests on the bottom of the drilled hole, then the load on the hook is the weight of the drill pipe column and the drill bit; this is called the free hook load. When the drill bit is boring into the earth formation, then the hook load represents the difference between the weight of the drill pipe column with its drill bit and the reacting force of the earth formation due to the drill pressure thereon. As the drill pipe column, which includes a plurality of sections of hollow drill pipes, has a uniform weight per unit length, then the free hook load represents the length of the drill pipe column. The drill bit pressure or load varies with the motive force applied to the drill bit and the type of earth formation being drilled and is determined by the difference between the free hook load and the hook load while drilling is in operation. In particular, it is to the permanent recording of the measurements of these two hook loads that the electrical measuring circuit of this invention is directed.

Various means have been used in the past in order to measure the free hook load or the hook load during drilling. One commonly used means includes an hydraulic converter connected to the cable carrying the hook load whereby the force of the strain in the cable is transduced to an equivalent hydraulic pressure. The value of the hydraulic pressure can then be transduced to an equivalent electrical resistance by using a pressure potentiometer which contains an electrical resistance element having a movable tap positioned thereon in accordance with the pressure applied to the pressure potentiometer. The said equivalent electrical resistance can then be determined by suitable electrical resistance measurement apparatus. Of course, the hydraulic pressure can also be determined by any of the commonly used direct reading pressure gages. Another means used in the prior art is an arrangement including a strain gage to indicate the strain in a structural element connected to the cable supporting the hook, whereby the strain in the structural element is measured by the strain gage in connection with a suitable electrical measuring circuit.

In order to make permanent recordings of the measurements, electrical graphic recorders may be used. These electrical graphic records may be classified as of two general types, i. e. one requiring a relatively high current input for operation and the other requiring a relatively low current input for operation. Now the type of electrical graphic recorder requiring a relatively low current input could satisfactorily operate to make permanent recording of the hook load if used with the above stated pressure potentiometer or the strain gage apparatus. However, the low current type of electrical recorder includes electronic amplifiers which cause it to be a delicate instrument and therefore undesirable for field use such as that in drilling for oil. On the other hand, the high current input electrical graphic recorder is rugged in construction and also less expensive in cost, but cannot be used directly with the strain gage circuit because of the latter's low current capacity, nor directly with the pressure potentiometer because of possible measurement errors due to the high current drain and because of the characteristic of the pressure potentiometers now in existance of having a "residual" resistance when no external pressure is applied thereto since the potentiometer tap invariably will not move to its zero resistance position.

Accordingly, it is the purpose of this invention to provide an electrical circuit, which will enable the use of the high current type of electrical graphic recorders by overcoming the above disadvantages. In addition, this invention also provides means for enabling both a direct measurement and permanent recording thereof of the difference between the free hook load and the hook load during drilling, i. e. the bit pressure.

It is therefore an object of this invention to provide an electrical circuit for measuring forces transduced to an equivalent electrical resistance.

Another object of the invention is to provide an electrical circuit for measuring forces transduced to an equivalent electrical resistance, said electrical circuit providing sufficient power to operate an electrical graphic recorder and additionally being capable of adjustment for high accuracy of measurement of the forces by the electrical graphic recorder.

An additional object of the invention is to provide an electrical circuit for measuring forces transduced to an equivalent electrical resistance and indicating the difference between the applied force and a predetermined or reference force such as the free hook load.

A further object of the invention is to provide an electrical circuit for measuring forces transduced to an equivalent electrical resistance and giving full scale deflection of the metering device for a predetermined amount of force to be measured.

Still another object of the invention is to provide an inexpensive and ruggedly constructed electrical circuit for measuring forces transduced to an equivalent electrical resistance, said electrical circuit providing sufficient power to operate an electrical graphic recorder requiring relatively high driving power, said electrical circuit being adjustable for high measurement accuracy of the measured forces.

A still further object of the invention is to provide an electrical circuit for measuring forces transduced to an equivalent electrical resistance and proving means for obtaining a zero indication for a predetermined amount of force to be measured.

And still another object of the invention is to provide an electrical circuit for measuring forces transduced to an equivalent electrical resistance, said electrical circuit enabling the metering device to be positioned at a distance from the position of the force.

Another object of the invention is to provide an electrical circuit to enable the measurement of hook load and bit load of oil drilling equipment.

The novel features which are believed to be characteristic of the invention, both as to its organization and method of operation will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1 shows conventional oil drilling equipment having a hook load transducer connected thereto.

Figure 2 shows a schematic diagram of an electrical circuit embodying this invention.

Figure 3 shows a schematic diagram of an electrical circuit for purposes of illustrating one feature of this invention.

Figure 4 shows a graph of normalized operating curves of the electrical circuit of Figure 3.

Referring now to Figure 1 there is shown oil drilling equipment including a supporting structure or derrick 10 mounted on a rotatable platform 11, and crown block pulleys 12 from which a travelling block 13 is suspended by a wire cable 14 fixedly secured at one end 15 to platform 11 through a tension indicator 16 and wire cable support 15a, and movably secured at its other end 17 by reel control means 18. Extending through a bore 19 in the earth formation 20 is a drill pipe column 21 which includes a plurality of hollow drill pipes 22 coupled together by couplings 23. The drill pipe column 21 is terminated at its lower end by a drill bit 24, and is terminated at its upper end by hook coupler 25 removably attached to hook 26 mounted on travelling block 13. Means are provided (although not shown) to rotate the drill pipe column and to operate the drill bit in order to drill into the earth formation.

The function of the tension indicator 16 connected to end 15 of wire cable 14 and to wire cable support 15a is to give an hydraulic pressure indication of the tension or strain in wire cable 14; said strain representing the load on hook 26. Tension indicator 16 is shown to include a piston 27 connected to end 15 of wire cable 14 in order to bear pressure against a non-compressible fluid 28 such as water in housing 29. At the bottom end of housing 29, wire cable support 15a rigidly connects tension indicator 16 to platform 11. Accordingly, the pressure in fluid 28 will also represent the load on hook 26.

In order to transduce or transform the amount of the pressure into an equivalent electrical resistance, Figure 1 shows a pressure potentiometer 30 connected to tension indicator 16. Said pressure potentiometer 30 contains a Bourdon tube which is a curved hollow chamber, the shape of the curve thereof changing according to the pressure of the fluid within the curved hollow chamber. A resistance element having a movable tap thereon is coupled to the curved hollow chamber by suitable linkages in order to move the resistance tap to a position to correspond with the fluid pressure within the curved hollow chamber.

Now, let us consider what the hook load represents. When the reel control means 18 is adjusted to raise travelling block 13 so that drill bit 24 does not rest upon the bottom of bore 19, then the hook load on hook 26 is the weight of the drill pipe column and the drill bit. This is called the free hook load as it represents the hook load when free of force on the drilling column from the earth's reacting force from the bottom of the bore. As the drill pipe sections of the drill pipe column are of uniform weight per unit length, and the weight of the drill bit is known, then the free hook load also represents the weight of the drill pipe column which is indicative of the depth of the bore.

When the drilling operation is in process, then drill bit 24 presses against the earth formation on the bottom of bore 19 resulting in a decreased hook load. The difference between the free hook load and the hook load during drilling is the drill bit load.

According to the present invention an electrical circuit is provided for measuring forces transduced to an equivalent electrical resistance. In order for the electrical circuit to effectively allow the measurement of the hook load of a derrick and the differential hook load thereon, it is necessary that the circuit be adjustable to the circuit constants of the measuring device and the value of the applied voltage. In addition, the electrical circuit should be capable of either effecting a direct hook load measurement or a differential hook load reading which enables the measuring device to measure drill bit pressure.

Referring now to Figure 2, there is shown an electrical circuit which is an embodiment of this invention. A voltage source which may be A. C. or D. C. is indicated by numeral 31 has one line connected to junction 32 through a variable voltage dropping resistor 33, and has its other line connected to junction 34. A balance resistor 35 having a movable arm or tap 36 is connected at its ends to junctions 32 and 34. Junction 32 connects to switch arm 37 of switch 38, said switch arm 37 being movable to contact either switch contact point 39 or 40. Similarly, junction 34 connects to switch arm 41 of switch 42, said switch arm 41 being movable to contact either switch contact point 43 or 44. Switch arms 37 and 41 are mechanically interlocked so that they contact either switch contact points 39 and 43 or switch contact points 40 and 44 simultaneously. Generally designated by numeral 30 is the pressure potentiometer shown in Figure 1, of which is only shown its electrical resistance element 45 having its two ends connected to switch contact points 40 and 44 respectively. Movable tap or arm 46 of electrical resistance element 45 is connected to switch arm 47 which in turn may be selectively connected to any one of switch contact points 48. Calibrating resistor 49 is connected between switch contact points 39 and 43 and has several taps respectively connected to switch contact points 48. Accordingly, switches 38 and 42 may connect either electrical resistance element 45 or calibrating resistor 49 across balance resistor 35. In between movable arm 36 of balance resistor 35 and movable arm 46 is a current operated indicating device 50 which includes an electrical graphic recorder 51 and a variable current limiting resistor 52.

If it is desired to obtain a direct reading of the current between movable arms 36 and 46 in addition to permanently recording such a reading by electrical graphic recorder 51 of current operated indicating device 50, then an ammeter may be placed in series or a voltmeter may be placed in parallel with current operated indicating device 50.

Considering now the operation of the electrical circuit of Figure 2, it will be noted that when no pressure is applied to pressure potentiometer 30 then movable tap 46 will be at its lowest position on electrical resistance element 45, i. e. toward switch contact point 44. Switch arms 37 and 41 of switches 38 and 42 are then moved to contact switch contact points 40 and 44 respectively in order to connect electrical resistance element 45 across voltage source 31 and variable voltage dropping resistor 33 and across balance resistor 35. By moving movable arm 36 of balance resistor 35 until a zero reading is obtained in indicating device 50, the electrical metering circuit will be balanced. Then any residual resistance between movable tap 46 and switch contact point 44 will be counterbalanced by a proportional resistance between movable arm 36 and junction 34 thus eliminating any error at zero pressure operating condition.

In order to calibrate the electrical metering circuit for having the indicating device 50 give a full scale or maximum reading for any predetermined value of pressure applied to pressure potentiometer 30, switch arms 37 and 41 are moved to connect to calibrating resistor 49 which thereby substitutes calibrating resistor 49 for electrical resistance element 45. Switch arm 47 is positioned to contact one of the switch contact points 48 which connect to calibrating resistor 49 at a point thereon that bears an equal relationship to the total value of the electrical resistance of calibrating resistor 49 as movable tap 46 will bear to electrical resistance element 45 for a predetermined pressure applied to pressure potentiometer 30. Current will then flow through indicating device 50, and the amount of current can be adjusted by varying variable current limiting resistor 52 for the desired reading of electrical graphic recorder 51 which may be full-scale deflection of the electrical graphic recorder. Accordingly, the electrical circuit will be adjusted for a given reading for a predetermined pressure applied to pressure potentiometer 30. Now switch arms 37 and 41 may be moved to contact switch contact points 40 and 44 and the electrical circuit is ready for operation.

If it is desired to obtain a differential pressure reading, i. e. a reading on the electrical graphic recorder 51 equivalent to the difference between a predetermined pressure representing a reference force (such as the above defined free hook load of the oil drilling apparatus of Fig. 1) and the pressure applied to pressure potentiometer 30 representing a reference force (such as the above defined free hook load of the oil drilling apparatus of Fig. 1), then switch arms 37 and 41 are connected to switch contact points 40 and 44 when the predetermined pressure is applied to pressure potentiometer 30. Movable tap 36 is then adjusted for a zero reading in indicating device 50. The calibrating resistor 49 may then be switched into the circuit and switch arm 47 positioned to contact one of switch contact points 48 whereby variable current limiting resistor 52 may be adjusted for a maximum reading in electrical graphic recorder 51 as described above for any desired pressure differential value. As the current flowing between movable arm 36 and movable arm 46 depends on the positioning of movable arms 36 and 46 on balance resistor 35 and electrical resistance element 45 respectively, then for a selected positioning of movable arm 36 to correspond with the position of movable arm 46 for a given applied pressure to pressure potentiometer 30, there then will be zero current flowing through indicating device 50 when such given pressure is applied to pressure potentiometer 30. If the positioning of movable tap 46 on electrical resistance element 45 is different from said stated position for zero current reading due to the value of applied pressure thereto, then the current flowing in the indicating device 50 depends upon the magnitude of the difference. The amount of current flowing through the indicating device 50 can be adjusted by varying the current limiting resistor 52 for a full scale deflection for any predetermined differential. For said predetermined pressure representing the free hook load as the reference force, the current flow in indicating device 50 represents the drill bit load, i. e. the difference between the reference force and the force applied to the transducer means.

In order to understand the function of variable voltage dropping resistor 33, the circuit of Figure 2 will first be considered to be operating to give a zero current reading in indicating device 50 when zero pressure is applied to pressure potentiometer 30. Then assuming that the value of the electrical resistance of balance resistor 35 is much larger than that of electrical resistance element 45, say over two times as much, then an approximately equivalent circuit is that shown in Figure 3, and the characteristic curve thereof is shown in Figure 4. Figure 3 shows voltage source 31 having one end connected to junction 32 through variable voltage dropping resistor 33, and having its other end connected to junction 34. Between junctions 32 and 34 is electrical resistance element 45 with its variable tap 46.

Indicating device 50 is shown to be directly connected between variable tap 46 and junction 34. Both calibrating resistor 49 and balance resistor 35 of Figure 2 are omitted in Figure 3. Figure 4 shows the operating characteristic curves of the circuit of Figure 3 wherein $i_L$ represents the ratio of the current flowing through indicating device 50 to the maximum current flowing through the indicating device 50, i. e. when movable arm 46 is at its uppermost position towards junction 32; and $R_p$ represents the ratio of the electrical resistance between movable tap 46 and junction 34 to the total resistance of electrical resistance element 45. In Figure 4 straight line 60 represents the ideal response characteristic of a measuring circuit, and the curves of Figure 4 are the operating curves of the electrical circuit of Figure 3, said operating curves are shown to deviate from straight line 60 in a greatly exaggerated amount in order to graphically represent the measurement errors of the electrical circuit of Figure 3.

If variable voltage dropping resistor 33 is adjusted to zero resistance, then curve 61 represents the operating characteristic of the circuit of Figure 3. If variable voltage dropping resistor is adjusted to one half the value of the resistance of electrical resistance element 45 then the operating characteristic curve is then curve 62. It will be noted that curve 62 crosses straight line 60 when $R_p$ equals one half. Furthermore, the maximum deviation of curve 62 from straight line 60 occurs at the one quarter and three quarter values of $R_p$ and at said points the deviations of curve 62 are approximately one third the amount of the deviations of curve 61 from straight line 60. If variable dropping resistor 33 is adjusted to three quarters of the value of electrical resistance element 45 then the operating characteristic curve 63 results; and curve 63 crosses straight line 60 when $R_p$ equals three quarters. Similarly, if variable dropping resistor 33 is adjusted to one quarter of the resistance value of electrical resistance element 45 then operating characteristic curve 64 results; and curve 64 crosses straight line 60 when $R_p$ equals one quarter. It can be shown mathematically that for any value of variable voltage dropping resistor 33, the operating characteristic curve thereof will cross straight line 60 when the value of variable dropping resistor equals the value of the portion of electrical resistance element 45 between movable tap 46 and junction 34.

Accordingly, it will be realized that the deviation of the characteristic curve from the ideal straight line 60 can be appreciably reduced by adjustment of variable voltage dropping resistor 33. Especially so, when only a portion of the operating characteristic curve is used as in measuring the differential hook load such as bit pressure measurement of the apparatus shown in Figure 1. In operation the free hook load would be substantially greater then the hook load during drilling, especially so when drill pipe column 21 extends an appreciable distance into bore 19. Then the bit pressure will be a relatively small fraction of the free hook load. If variable voltage dropping resistor 33 is adjusted so that the operating characteristic curve crosses straight line 60 near to the difference between the free hook load reading which is at the value of $R_p$ equals 1.0 and the hook load during drilling, and the electrical circuit of Figure 2 is adjusted as hereinabove described for reading drill bit pressure, then the accuracy of the measurement of the electrical measuring circuit of Figure 2 will be maximum. The inclusion of balance resistor 35 when differential force measurement is desired will not appreciably change the operation of the circuit of Figure 2 from that illustrated in Figures 3 and 4 since the balance resistor may be of much greater value than that of electrical resistance element 45 of pressure potentiometer 30.

The utility of the above described electrical measuring circuit lies in the simplicity of its component elements as the circuit comprises a combination of electrical resistors, a voltage source, and an electrical graphic recorder of the more rugged type. Accordingly, the circuit is well adapted for measurements of oil drilling apparatus. In addition, the electrical circuit of this invention may be adjusted to give measurements of both free hook load and drill bit pressure of oil drilling equipment, and this circuit also provides means for obtaining greater measurement accuracy in the measurement of drill bit pressure when such greater accuracy is required. An additional advantage of this present invention is that the electrical graphic recorder may be placed at a distance from the oil drilling equipment thus preventing interference with oil drilling operations. Even though it is particularly desirable to utilize the circuit of this invention with the type of electrical graphic recorder using a relatively high amount of current, this circuit may also be used with the other type of electrical graphic recorder or with also any electrical measuring indicator even though no permanent record is made of the measurements.

Although this invention has been described with reference to a pressure potentiometer, it will be realized that any means for converting an amount of force such as a weight to an equivalent value of electrical resistance may be utilized with the electrical measuring circuit of this invention.

Having herein described the invention, what is claimed as new is:

1. An electrical measuring circuit responsive to an applied voltage for measuring forces transduced to an equivalent electrical resistance, said circuit comprising: an electrical resistance element having a variably positionable tap thereon; transducer means to move said tap of the electrical resistance element to a position equivalent to a force applied to the transducer means; a balance resistor having a variably positionable tap thereon, said balance resistor being connected in parallel with the electrical resistance element; a current operated indicating device connected between the taps of the electrical resistance element and of the balance resistor, said variably positionable tap of the balance resistor being adjustable to give a zero reading in the current operated indicating device for a desired reference force applied to the transducer means, said current operated indicating device indicating the difference between the reference force and the force applied to the transducer means; a voltage source; and a voltage dropping resistor connected in series with the voltage source across the electrical resistance element to minimize errors in measurement of the differential force.

2. The electrical measuring circuit according to claim 1 which additionally includes a calibrating resistor having a tap thereon; and switching means to replace the electrical resistance element with the calibrating resistor.

3. The electrical measuring circuit according to claim 1 which additionally includes a calibrating resistor having a plurality of taps thereon; and switching means to replace the electrical resistance element with the calibrating resistor whereby the current operated indicating device connects to one selected tap of the plurality of taps on the calibrating resistor instead of to the tap of the electrical resistance element.

4. The electrical measuring circuit according to claim 1 wherein the voltage dropping resistor is variable.

5. An electrical measuring circuit responsive to an applied voltage for measuring forces transduced to an equivalent electrical resistance, said circuit comprising: an electrical resistance element having a variably positionable tap thereon; transducer means to move said tap of the electrical resistance element to a position equivalent to a force applied to the transducer means; balancing means connected across the electrical resistance element and having a balance resistor with a variable tap thereon; a current operated indicating device connected between the taps of the electrical resistance element and of the balancing means, said variably positionable tap of the balance means being adjustable to give a zero reading in the current operated indicating device for a desired reference force applied to the transducer means, said current operated indicating device indicating the difference between the reference force and the force applied to the transducer means; a voltage source; and a voltage dropping resistor connected in series with the voltage source across the electrical resistance element to minimize errors in measurement of the differential force.

6. An electrical measuring circuit responsive to an applied voltage for measuring forces transduced to an equivalent electrical resistance, said circuit comprising: an electrical resistance element having a variably positionable tap thereon responsive to forces to be measured; a balance resistor having a variably positionable tap thereon, said balance resistor being connected in parallel with the electrical resistance element; a current operated indicating device connected between the taps of the electrical resistance element and of the balance resistor, said variably positionable tap of the balance resistor being adjustable to give a zero reading in the current operated indicating device for a desired reference force applied to the transducer means, said current operated indicating device indicating the difference between the reference force and the force applied to the transducer means; a voltage source; and a voltage dropping resistor connected in series with the voltage source across the electrical resistance element to minimize errors in measurement of the differential force.

7. The electrical measuring circuit according to claim 6 which additionally includes a calibrating resistor having a tap thereon; and switching means to replace the electrical resistance element with the calibrating resistor.

8. The electrical measuring circuit according to claim 6 wherein the voltage dropping resistor is variable.

9. An electrical measuring circuit responsive to an applied voltage for measuring forces transduced to an equivalent electrical resistance, said circuit comprising: an electrical resistance element having a variably positionable tap thereon responsive to forces to be measured; balancing means connected across the electrical resistance element and having a balance resistor with a variable tap thereon being adjustable for a desired reference force; and a current operated indicating device connected between the taps of the electrical resistance element and of the balance means to indicate the difference between the applied force and the reference force.

10. An electrical measuring circuit comprising: an electrical resistance element having a variable positionable tap thereon responsive to forces to be measured; a balance resistor connected across the electrical resistance element, said balance resistor having a variably positionable tap thereon; a current operated indicating device connected between the taps of the electrical resistance element and of the balance resistor, said current operated indicating device including an electrical graphic recorder and a variable current limiting resistor connected in series, said variably positionable tap of the balance resistor being adjustable to give a zero reading in the current operated indicating device for a desired reference force, said current operated indicating device indicating the difference between the reference force and the applied force; a voltage source; a voltage dropping variable resistor connected in series with the voltage source to minimize errors in measurement of the differential force, said voltage source and voltage dropping variable resistor being connected in parallel with the electrical resistance element; a calibrating resistor having at least one tap thereon; and switching means to replace the electrical resistance element with the calibrating resistor.

11. An electrical measuring circuit comprising: an electrical resistance element having a variably positionable tap thereon responsive to forces to be measured; a balance resistor connected across the electrical resistance element, said balance resistor having a variably positionable tap thereon to reference the force to be measured to a desired reference force; a current operated indicating device connected between the taps of the electrical resistance element and of the balance resistor to indicate the difference between the reference force and the applied force; a variable resistor to minimize errors in measurement of the differential force; and a voltage source connected in series with the variable resistor and in parallel with the electrical resistance element.

12. The electrical measuring circuit according to claim 11 which additionally includes a calibrating resistor having at least one tap thereon; switching means to replace the electrical resistance element with the calibrating resistor, and a current limiting resistor connected in series the current operated indicating device for controlling the reading thereof.

References Cited in the file of this patent

UNITED STATES PATENTS

| | | |
|---|---|---|
| 2,528,883 | Hayward | Nov. 7, 1950 |
| 2,592,009 | Clement et al. | Apr. 8, 1952 |
| 2,688,727 | Ruge | Sept. 7, 1954 |
| 2,715,331 | Yates | Aug. 16, 1955 |
| 2,727,387 | Cherniak | Dec. 20, 1955 |